United States Patent

[11] 3,608,511

[72] Inventor Bernard R. Katshen
c/o Famet Marine 745 2nd Ave., Redwood City, Calif. 94063
[21] Appl. No. 5,228
[22] Filed Jan. 23, 1970
[45] Patented Sept. 28, 1971

[54] ROLLER REEF ACTUATING MECHANISM AND BRAKE
7 Claims, 6 Drawing Figs.

[52] U.S. Cl. .................................................. 114/106
[51] Int. Cl. .................................................. B63h 9/04
[50] Field of Search ........................................ 114/106, 102, 105, 39

[56] References Cited
UNITED STATES PATENTS
3,280,780 10/1966 Aulin ........................... 114/106
3,522,786 8/1970 Randell-Clark .............. 114/106

Primary Examiner—Trygve M. Blix
Attorney—Julian Caplan

ABSTRACT: A sail may be reefed by geared roller reefing whereby the lower end of the sail is wrapped around a horizontal boom pivotally attached to a mast. A housing is attached to the mast by a universal joint connection. Within the housing is a spiral worm gear held in position by a snapring engaging grooves in housing and gear. A hexagonal shaft extends from the gear and is received in the "bottle" formed on the adjacent end of the boom. A worm in the housing is turned by a crank to turn the gear and thus the boom with a low ratio of about 11:1. The worm carries adjacent either end an O-ring which fits against a bore in the housing and the hole in a hollow nut which is threaded into the housing and the hole in a hollow nut which is threaded into the housing over the opposite end of the worm to hold the latter in place. The O-rings act as a brake to prevent reverse rotation of the boom which would otherwise occur because of the ratio and also to seal lubricant.

PATENTED SEP 28 1971

INVENTOR.
BERNARD KATSHEN, Sr.
BY
*Julian Caplan*
ATTORNEY

INVENTOR.
BERNARD KATSHEN, Sr.
BY
ATTORNEY

ROLLER REEF ACTUATING MECHANISM AND BRAKE

This invention relates to a new and improved roller reef actuating mechanism and brake. Reefing of the sail of boats has recently been improved by rotatably mounting the boom to which the lower end of the sail is attached relative to the mast. When the boom is rotated around its longitudinal axis perpendicular to the axis of the mast, either manually or by a motor, the sail is wrapped around the boom. The present invention comprises a mechanism for rotating the boom.

An important feature of the invention is the fact that the mechanism employs a worm rotatable in a housing which is sealed at one end of the housing by an O-ring and at the other end to a hollow retaining nut by a second O-ring. The O-rings not only function to hold the lubricant within the housing of the mechanism but, very importantly, function as brakes to prevent the pressure of the boom from causing reverse rotation of the worm. In other words, the O-rings function as a brake to keep the boom from turning unintentionally.

The present invention employs a very low tooth ratio between the gear and the worm, making it possible to use a double lead worm with a low helix angle on the worm wheel. Normally, such a gear arrangement would result in reverse rotation of the worm when pressure was applied to the boom tending to turn the same. The present invention provides a small, compact, efficient brake which works automatically.

Another feature of the mechanism is the fact that the gear comprises its own shaft, bearing at each end against the housing. Thus the number of parts is reduced.

The entire housing is small and is totally enclosed and sealed making the device trouble free.

Other objects of the present invention will become apparent upon reading the following specification and referring to the accompanying drawings in which similar characters of reference represent corresponding parts in each of the several views.

Figure 1:
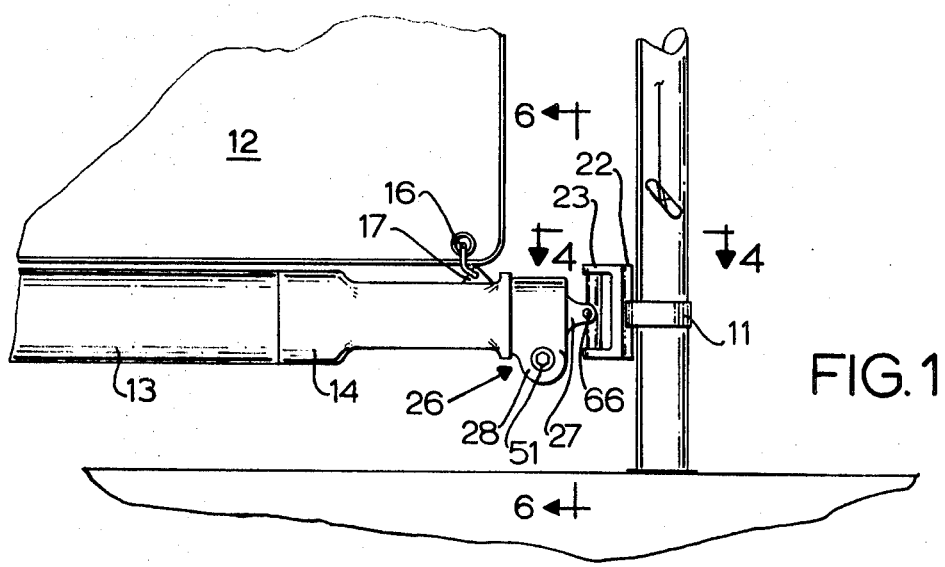
FIG. 1 is a fragmentary side elevational view of a portion of the mast, boom and sail with which the present invention is used.
Figure 2:
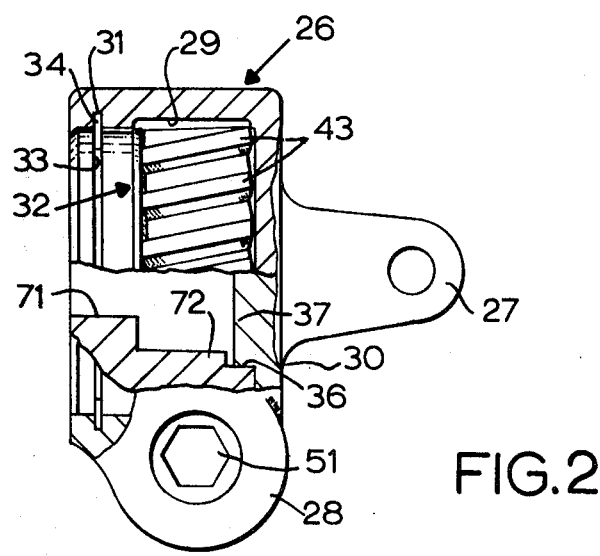
FIG. 2 is an enlarged elevational view of the mechanism which is the subject of this invention partly broken away in section to reveal internal construction.
Figure 3:
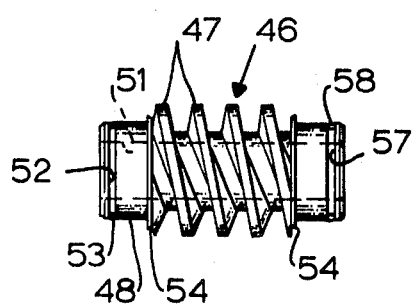
FIG. 3 is an elevational view of the worm of the present invention and its associated mechanism.
Figure 4:
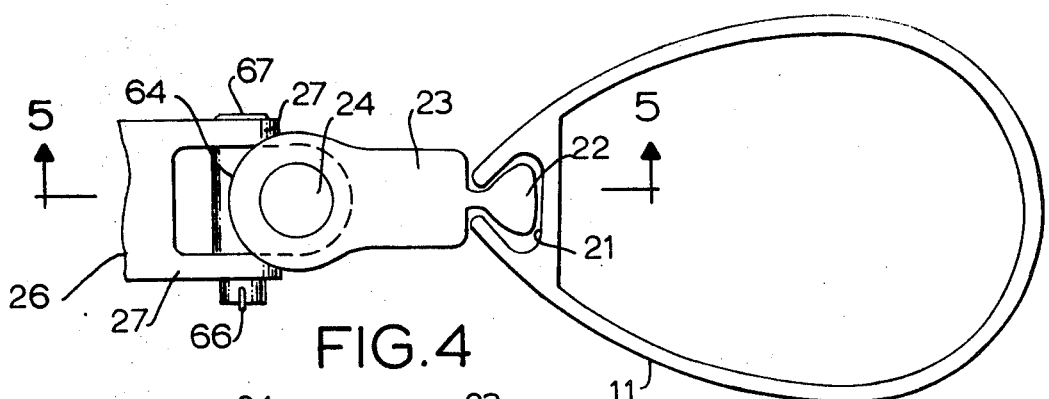
FIG. 4 is an enlarged sectional view through a portion of the structure of FIG. 1.
Figure 5:
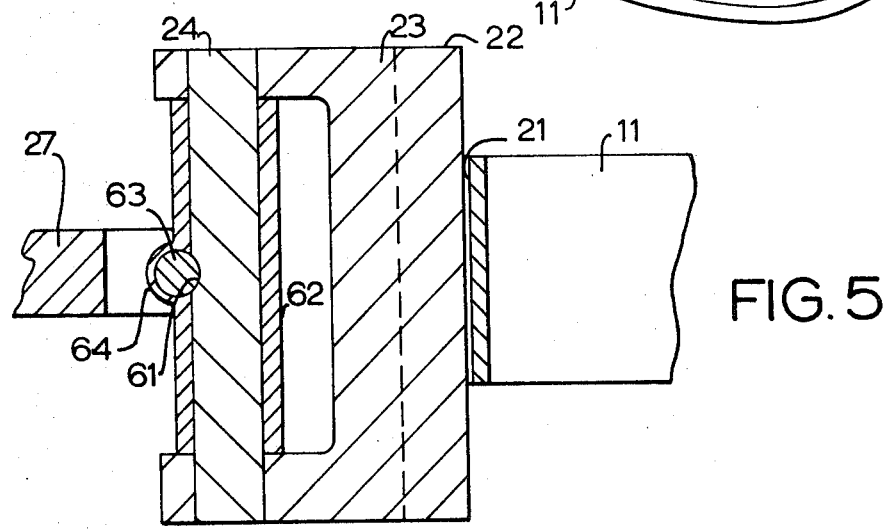
FIG. 5 is a sectional view taken substantially along line 5—5 of FIG. 4.

As shown more or less schematically and fragmentarily, a boat has a mast 11 from which the upper end (not shown) of sail 12 is supported. Boom 13 extends horizontally perpendicular to mast 11 and has adjacent to its inner end a "bottle" 14 to which the sail 12 is attached by means of shackle 16 which passes through projection 17 on bottle 14.

One means of attachment of the boom 13 to the mast 11 is illustrated and described herein, it being understood that other means are available.

Masts 11 are of various construction. The mast 11 shown herein is formed with a vertical, T-shaped groove 21 which receives tongue 22 of clevis fitting 23. Pin 24 extends between the arms of fitting 23, said pin having an arcuate notch 61 midway of its length. Sleeve 62 fits over pin 24 and also extends between the arms of fitting 23. Transverse pin 63 fits through boss 64 on sleeve 62, also extending through notch 61 and thus restraining pin 24 against removal. Transverse pin 63 extends out through the ends of boss 64 and the ends of said pin are received in holes in projecting clevis arms 27 of actuating mechanism 26. Boss 64 also fits between arms 27. Transverse pin 63 is also held in place by spring clip 66 which fits through a hole adjacent one end of pin 63 outside one arm 27, the other end of the pin having an enlarged head 67 on the outside of opposite arm 27. Thus one transverse pin 63 holds in place the universal joint connection between mast 11 and mechanism 26.

Mechanism 26 has a hollow housing formed with a boss 28 on one area of its generally circular shape. Housing 26 is formed with a bore 29 which extends from its open end toward its closed end 30. Adjacent the open end there is a peripheral groove 31 in bore 29. Gear 32 fits through the open end of the housing and is formed adjacent one end with a groove 33 which mates with groove 31. To assemble the parts, a snapring 34 is collapsed into groove 33 and gear 32 is then inserted in bore 29. When it is fully inserted, the ring 34 expands so that it extends both into grooves 31 and 33 thereby locking the gear 32 within housing 26. The outer end of gear 32 is finished to rotatably seat within the finished outer end of bore 29. The inner end of gear 32 is supported by a boss 37 on the interior of end wall 30 which fits into a corresponding bore 36 in gear 32. Hence the gear 32 is fully supported by a very simple structure without the use of special bearings.

The teeth 43 of gear 32 are formed with a helix angle of about 13° 14′. Worm 46 has double lead threads 47 which mesh with teeth 43 at a ratio of about 11 to 1. It is characteristic of such tooth shapes and gear ratios that reverse rotation of gear 32 would ordinarily cause rotation of worm 46, contrary to the general theory of worm and worm wheel relationships. It is important to avoid the necessity of a separate brake for mechanism 26 to brake the rotation of worm 46 as hereinafter explained.

A hexagonal socket 71 is formed in the outer end of gear 32 and an enlarged bore 72 behind socket 71. A hexagonal shaft (not shown) having an enlarged head disposed inside bore 72 and extending through socket 71 connects to and turns bottle 14.

Worm 46 is rotatably mounted within boss 28. One end 48 of worm 46 is smooth and fits within a bore within boss 28 which provides a bearing therefor. A shoulder 49 is formed in the bore in boss 28 and a thrust washer 54 which fits over the smooth portion 48 and bears against the tooth portions 47 fits against such shoulder and holds the worm 46 against movement to the left as viewed in FIG. 6. A hexagonal hole 51 in worm 46 receives an end of a crank (not shown) which is used to wind the worm 46 in either direction. Groove 52 is formed in portion 48 and receives O-ring 53 which bears against the bore in boss 28 sealing lubricant within the housing but, more importantly, functioning as a brake which restrains rotation of worm 46 except when stem 51 is turned.

Figure 6:
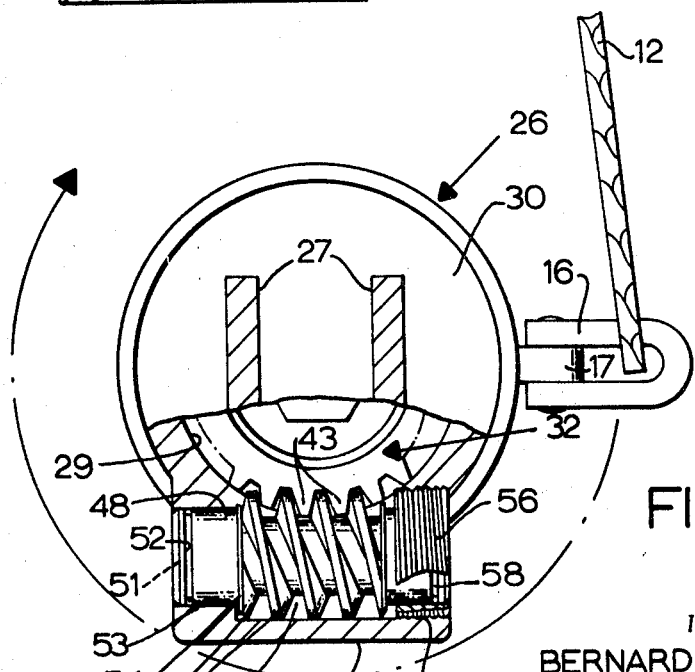
FIG. 6 is an elevational view taken substantially along the line 6—6 of FIG. 1 partly broken away in section to reveal internal construction.

At the opposite end of worm 46 a hollow or annular nut 56 is threaded into a threaded bore 59 in boss 28. The right-hand end of worm 46 as viewed in FIG. 6 is provided with a second thrust washer 54 which bears against the inner end of nut 56 and restrains movement to the right. The right-hand smooth end of worm 46 is formed with a second groove 57 receiving an O-ring 58 which seals against the inside of nut 56 and also functions along with O-ring 53 as a brake.

As is apparent, worm 46 turns gear 32 in either direction and thereby the sail 12 may be wrapped or unwrapped relative to bottle 14, as the latter rotates in either direction. The pressure of the sail which tends to turn bottle 14 is braked by the O-rings 53, 58 bearing against the surfaces against which they seal.

Although the foregoing invention has been described in some detail, by way of illustration and example for purposes of clarity of understanding, it is understood that certain changes and modifications may be practiced within the spirit of the invention and scope of the appended claims.

1. In a roller reef assembly for sailboats wherein a sail is supported by a mast and a boom transverse to said mast, an actuating mechanism to rotate said boom about its longitudinal axis transverse to said mast comprising a housing, support means for having said housing on said mast, said housing being formed with a closed end adjacent said support means and an open end opposite said closed end, a gear rotatable within said housing, cooperating means on said gear and said housing retaining said gear in place, said gear closing off said open end, means sn said gear for attachment of said gear to said boom for rotating of said boom with said gear, said housing having a hollow boss formed with a second bore transverse to said first-mentioned bore, a pinion meshing with said gear rotatable within said second bore and having first and second ends, each said end formed with a groove, said first end rotatable within said second bore and exposed at one end of said boss and formed with means cooperating with a handle to rotate said pinion, means holding said second end in said boss and formed with a hole receiving said second end of said pinion, and an O-ring in each said groove, one said O-ring engaging said second bore and the other said O-ring said hole, said O-rings retarding rotation of said pinion within said boss, whereby said O-rings brake rotation of said pinion, gear and boom against pressure on said boom tending to rotate said boom.

2. A mechanism according to claim 1, in which the gear ratio of said gear and pinion is approximately 11 to 1.

3. A mechanism according to claim 2, in which said gear has helical teeth of an angle of about 13°.

4. A mechanism according to claim 3, in which said pinion has a double thread.

5. A mechanism according to claim 1, in which said gear is hollow having a third bore adjacent said closed end of said housing, said closed end having an internal boss fitting into said third bore and supporting said gear.

6. A mechanism according to claim 1, in which said cooperating means comprises a deep groove in said gear, a groove in said housing opposite said deep groove and a snapring partially in each of said last-mentioned grooves, said snapring collapsible within said deep groove to permit insertion of said gear into said housing and expandable when said gear is in place to restrain removal of said gear from said housing.

7. The combination of claim 1 which further comprises a universal joint connection to connect said actuating mechanism to a mast comprising a pair of first clevis arms extending from said closed end of said housing, a transverse pin through said first clevis arms, a sleeve formed with a transverse boss, said transverse pin passing through said boss and intersecting the bore of said sleeve, a clevis fitting having second clevis arms between which said sleeve extends, said clevis fitting having mast-engaging means to secure said clevis fitting to a mast, a second pin formed with a notch passing through said sleeve with said notch receiving said transverse pin, said second pin extending into holes in said second clevis arms, and removable retaining means retaining said transverse pin in said first clevis arms and said transverse pin retaining said second pin in said second clevis arms.